US012752921B2

(12) United States Patent
Kilchyk et al.

(10) Patent No.: US 12,752,921 B2
(45) Date of Patent: Oct. 6, 2026

(54) ADDITIVELY MANUFACTURED HEAT EXCHANGER AND DIFFUSER PIPE COUPLED TO A COMPRESSOR STAGE

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/786,857

(22) Filed: Jul. 29, 2024

(65) Prior Publication Data

US 2026/0028126 A1 Jan. 29, 2026

(51) Int. Cl.
*B64D 13/08* (2006.01)
*B33Y 80/00* (2015.01)
(Continued)

(52) U.S. Cl.
CPC ............. *B64D 13/08* (2013.01); *B64D 13/02* (2013.01); *F04D 29/441* (2013.01); (Continued)

(58) Field of Classification Search
CPC ....... B64D 13/08; B64D 13/02; F04D 29/441; F04D 29/5826; F28D 2021/0021; B33Y 80/00
See application file for complete search history.

(56) References Cited

U.S. PATENT DOCUMENTS 2,518,246 A * 8/1950 Morris ................... B64D 13/06 62/402
4,503,683 A * 3/1985 Wieland .................. F25B 9/004 62/402
(Continued)

FOREIGN PATENT DOCUMENTS

EP 3248877 A1 * 11/2017 ............. B64D 13/02
EP 3249198 A1 * 11/2017 ........... F04D 27/002
(Continued)

OTHER PUBLICATIONS

Han et al., "The investigation of mechanisms on pipe diffuser leading edge vortex generation and development in centrifugal compressor", Applied Thermal Engineering 219, 2023, pp. 1-13.
(Continued)

*Primary Examiner* — Ryan C Clark
(74) *Attorney, Agent, or Firm* — CANTOR COLBURN LLP

(57) ABSTRACT

An aircraft system having an impeller housing, an impeller housed within the impeller housing, wherein the impeller housing extends from an inlet end and to an outlet end, wherein the outlet end defines circumferentially distributed radially facing outlet ports, wherein in operation an airflow moves along a first axial direction into the inlet end of the impeller housing and is compressed by the impeller; a heat exchanger that is positioned radially exterior to the impeller housing and extends axially from an inlet end to an outlet end, wherein the inlet end of the heat exchanger defines inlet ports, and wherein in operation airflow into the heat exchanger moves along a second axial direction that is opposite the first axial direction; and diffuser pipes, wherein ones of the diffuser pipes connect ones of the inlet ports of the heat exchanger with ones of the outlet ports of the impeller housing.

11 Claims, 3 Drawing Sheets

(51) Int. Cl.

| | |
|---|---|
| ***B64D 13/02*** | (2006.01) |
| ***F04D 29/44*** | (2006.01) |
| ***F04D 29/58*** | (2006.01) |
| ***F28D 21/00*** | (2006.01) |

(52) U.S. Cl.

CPC .......... *F04D 29/5826* (2013.01); *B33Y 80/00* (2014.12); *F28D 2021/0021* (2013.01)

(56) References Cited

U.S. PATENT DOCUMENTS

| | | | | |
|---|---|---|---|---|
| 5,105,617 | A * | 4/1992 | Malohn | F28D 9/0025 165/165 |
| 6,589,015 | B1 * | 7/2003 | Roberts | F01D 9/048 415/211.2 |
| 8,042,354 | B1 * | 10/2011 | Dziorny | B64D 13/06 62/402 |
| 9,752,585 | B2 * | 9/2017 | Kupratis | F02C 3/08 |
| 10,859,096 | B2 * | 12/2020 | Drolet | F02C 3/08 |
| 11,333,173 | B2 * | 5/2022 | Nichols | F04D 29/5826 |
| 11,391,296 | B1 * | 7/2022 | Duong | F04D 29/441 |
| 11,859,543 | B2 * | 1/2024 | Nichols | F04D 29/284 |
| 2003/0218096 | A1 * | 11/2003 | Marche | F28F 27/02 244/118.5 |
| 2007/0113579 | A1 * | 5/2007 | Claeys | B64D 13/02 62/401 |
| 2017/0341758 | A1 * | 11/2017 | Bruno | F04D 25/045 |
| 2017/0341764 | A1 * | 11/2017 | Bruno | F01D 5/06 |
| 2018/0370636 | A1 * | 12/2018 | Laborde | B64D 13/04 |
| 2019/0225344 | A1 * | 7/2019 | McCord | F28F 9/0207 |
| 2021/0001993 | A1 * | 1/2021 | Retersdorf | F28F 3/02 |
| 2023/0065642 | A1 * | 3/2023 | Clements | F04D 13/0653 |
| 2023/0331390 | A1 * | 10/2023 | Merritt | H02K 5/203 |
| 2024/0017836 | A1 | 1/2024 | Ryon et al. | |

FOREIGN PATENT DOCUMENTS

| | | | | |
|---|---|---|---|---|
| EP | 3258115 A1 * | 12/2017 | | F04D 29/441 |
| EP | 4148285 A1 * | 3/2023 | | F01D 21/045 |
| EP | 4289744 A1 * | 12/2023 | | B64D 13/00 |
| GB | 2623789 A * | 5/2024 | | F02B 29/045 |

OTHER PUBLICATIONS

Lavaa, Anaa "Radial Compressor: Parts and Working Principles", Linquip, Jun. 14, 2021, pp. 1-4.

Sun et al., "Flow Characteristics of a Pipe Diffuser for Centrifugal Compressors", Journal of Applied Fluid Mechanics, vol. 10, No. 1, 2017, pp. 143-155.

* cited by examiner

ADDITIVELY MANUFACTURED HEAT EXCHANGER AND DIFFUSER PIPE COUPLED TO A COMPRESSOR STAGE

BACKGROUND

The embodiments are directed to an environmental control system (ECS) of an aircraft and more specifically to an additively manufactured heat exchanger and diffuser pipe coupled to a compressor stage of a compressor-heat exchanger assembly.

A traditional environmental control system (ECS) is one type of compressor-heat exchanger assembly that includes components such as an air cycle machine (ACM) and heat exchangers (HXs) which are separated from the ACM. Other types of compressor-heat exchanger assemblies include, e.g., an OBIGGS assembly. In such assemblies, headers and ducting are required to direct flow between the components. Ducting restricts the area of the flow path, which results in pressure losses and system inefficiencies.

BRIEF DESCRIPTION

Disclosed is an aircraft system including a impeller housing, an impeller housed within the impeller housing, wherein the impeller housing extends from an inlet end and to an outlet end, wherein the outlet end defines circumferentially distributed radially facing outlet ports, wherein in operation an airflow moves along a first axial direction into the inlet end of the impeller housing and is compressed by the impeller; a heat exchanger that is positioned radially exterior to the impeller housing and extends axially from an inlet end to an outlet end, wherein the inlet end of the heat exchanger defines inlet ports, and wherein in operation airflow into the heat exchanger moves along a second axial direction that is opposite the first axial direction; and diffuser pipes, wherein ones of the diffuser pipes connect ones of the inlet ports of the heat exchanger with ones of the outlet ports of the impeller housing.

In addition to one or more aspects of the system or as an alternate, the impellor is compressor and the system is an air cycle machine, a VCS or an OBIGGS.

In addition to one or more aspects of the system or as an alternate, the impellor is a cabin-air compressor.

In addition to one or more aspects of the system or as an alternate, the system includes an axially extending inlet conduit coupled to the inlet end of the impeller housing, wherein in operation, the airflow into the inlet conduit moves along the first axial direction and into the impeller housing, wherein the heat exchanger extends axially over the inlet conduit.

In addition to one or more aspects of the system or as an alternate, each diffuser pipe extends from an inlet end to an outlet end; the inlet end of the diffuser pipe is coupled to one of the outlet ports of the impeller housing and the outlet end of the diffuser pipe is coupled to one of the inlet ports of the heat exchanger; and a pipe bend is defined between the inlet and outlet ends of the diffuser pipe, so that the airflow is radial at the inlet end of the diffuser pipe and axial at the outlet end of the diffuser pipe.

In addition to one or more aspects of the system or as an alternate, the inlet end of the diffuser pipe has a first surface area, and the outlet end of the diffuser pipe has a second surface area that is larger than the first surface area.

In addition to one or more aspects of the system or as an alternate, the inlet end of the diffuser pipe has a circular cross section and the outlet end of the diffuser pipe has an elliptical cross section.

In addition to one or more aspects of the system or as an alternate, the diffuser pipe extends along a spiral path between the inlet and outlet ends.

In addition to one or more aspects of the system or as an alternate, the system includes a plurality of the heat exchangers circumferentially distributed about the impeller housing, each defining the inlet ports; and ones of the diffuser pipes connect ones of the inlet ports of the heat exchangers with ones of the outlet ports of the impeller housing.

In addition to one or more aspects of the system or as an alternate, the aircraft system is an air cycle machine.

In addition to one or more aspects of the system or as an alternate, the impeller housing is a compressor housing and the impeller is a compressor stage.

In addition to one or more aspects of the system or as an alternate, the system includes a first turbine that is axially aligned with the inlet end of the impeller housing, is disposed on an opposite axial side of the impeller housing relative to the inlet conduit, and is coupled to the impeller housing via a first shaft.

In addition to one or more aspects of the system or as an alternate, the system includes a second turbine that is axially aligned with the first turbine, disposed on a same side of the impeller housing as the first turbine, and is operationally coupled to the first turbine via a second shaft.

In addition to one or more aspects of the system or as an alternate, the heat exchanger and the diffuser pipes define a unitary body.

In addition to one or more aspects of the system or as an alternate, the heat exchanger and the diffuser pipes are formed via additive manufacturing.

A method of manufacturing a heat exchanger assembly of an aircraft system, including defining a heat exchanger that is configured for being positioned radially exterior to an impeller housing, wherein the heat exchanger extends axially from a heat exchanger inlet end to a heat exchanger outlet end, and defining inlet ports at the heat exchanger inlet end; defining diffuser pipes having outlet ends that are located at ones of the inlet ports of the heat exchanger, and inlet ends that are positioned to connect with ones of radially facing outlet ports of the impeller housing; and additively manufacturing the heat exchanger and the diffuser pipes as a unitary structure.

In addition to one or more aspects of the method or as an alternate, the diffuser pipes are defined to include a pipe bend between the inlet and outlet ends of the diffuser pipes, so that the airflow is radial at the inlet end of the diffuser pipes and axial at the outlet end of the diffuser pipes.

In addition to one or more aspects of the method or as an alternate, the diffuser pipes are defined to extend along a spiral path between the inlet and outlet ends of the diffuser pipes.

In addition to one or more aspects of the method or as an alternate, the diffuser pipes are defined so that the inlet end of the diffuser pipe has a first surface area that is circularly shaped, and the outlet end of the diffuser pipe has a second surface area that is larger than the first surface area and is elliptically shaped.

In addition to one or more aspects of the method or as an alternate, the method includes defining a plurality of the heat exchangers that are circumferentially distributed about the impeller housing, each defining the inlet ports, wherein ones of the diffuser pipes are positioned at ones of the inlet ports of the heat exchangers and are positioned to connect with ones of the outlet ports of the impeller housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus are presented herein by way of exemplification and not limitation with reference to the Figures.

Figure 1:
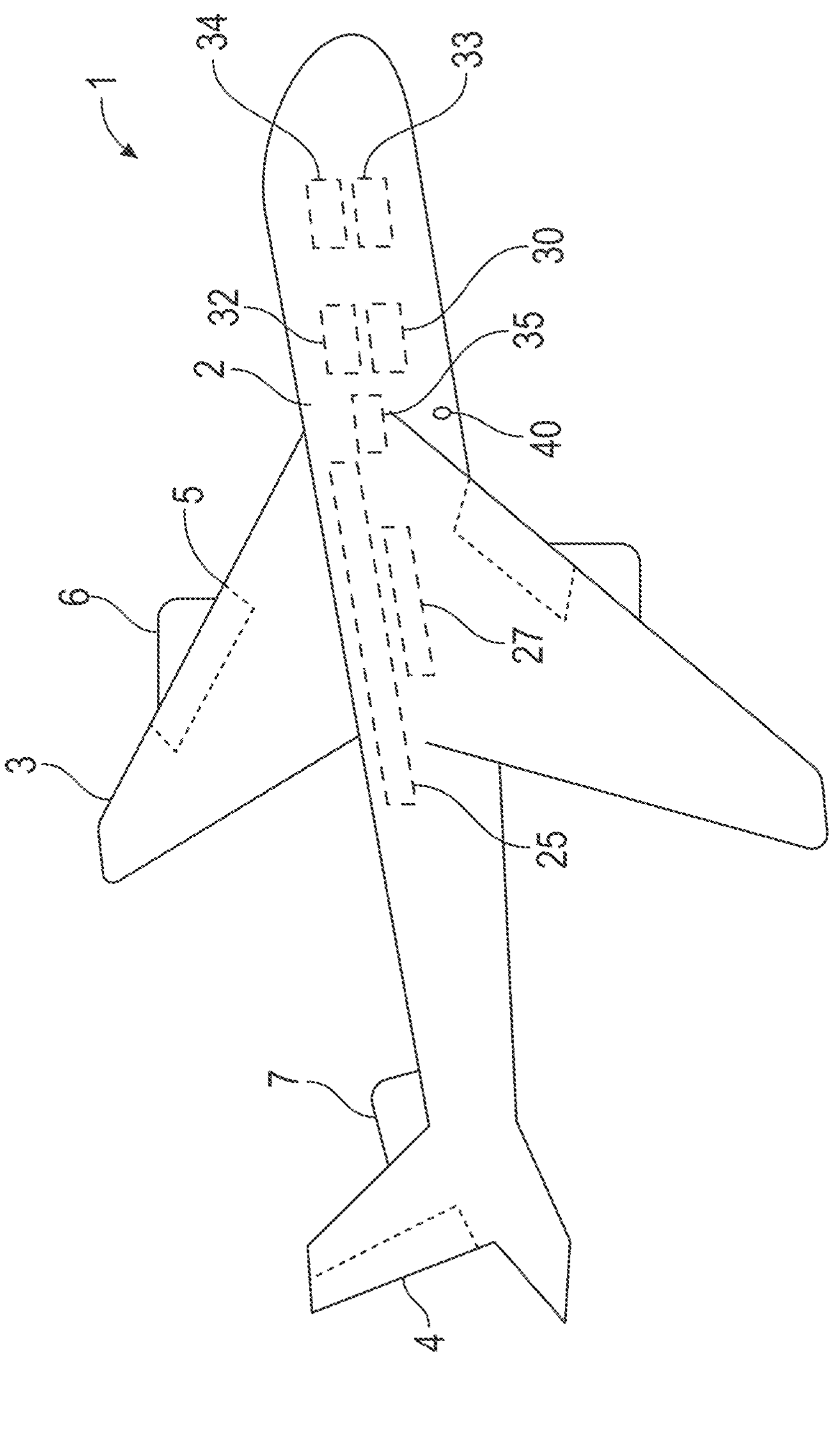
FIG. 1 shows an aircraft that may have aspects of the disclosed embodiments.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have a cabin 25, a cargo bay 27, an environmental control system (ECS) 30 for conditioning the cabin 25 and/or cargo bay 27. The ECS 30 may include a vapor compression system (VCS) 32 that cools air directed to, e.g., the cargo bay 27 and provides refrigeration to one or more systems 35 of the aircraft 1, and an air cycle machine (ACM) that cools air directed to e.g., the cabin 25. A RAM air inlet 40 may scoop air for the ECS 30, or the ECS 30 may receive air recirculated from, e.g., a cabin air compressor (CAC) 34.

The embodiments are directed to a compressor-heat exchanger assembly. As indicated, the ECS 30 is one type of compressor-heat exchanger assembly. However, reference to the ECS 30 is not intended on limiting the scope of the embodiments. Other types of compressor-heat exchanger assemblies include, as indicate and without limitation, an OBIGGS assembly. Further, reference below to a compressor 105 herein is not intended in being limited to an ACM 33. Rather, the compressor 105 may be a cabin air compressor that is coupled to a primary heat exchanger, a VCS compressor, an OBIGGS compressor.

Figure 2A:
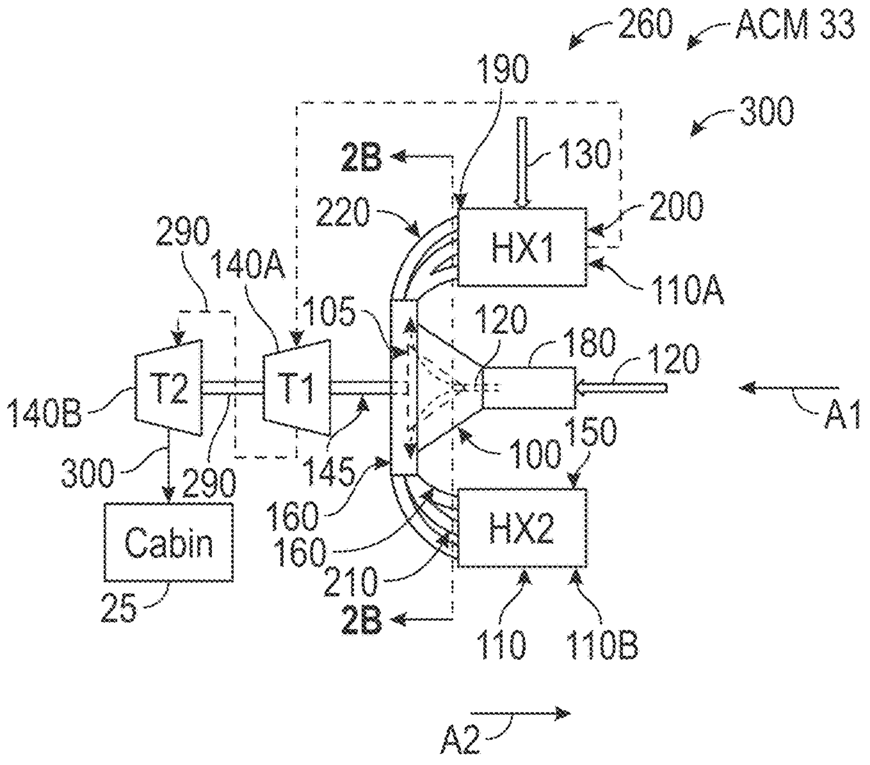
FIG. 2A shows an environmental control system of the aircraft of FIG. 1 having additively manufactured heat exchanger and diffuser pipe coupled with a compressor stage.
Figure 2B:
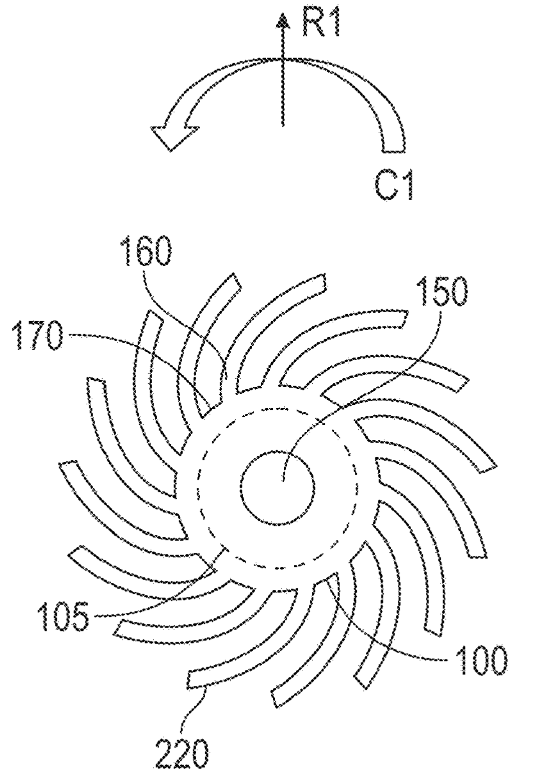
FIG. 2B shows the additively manufactured heat exchanger and diffuser pipe along lines 2B-2B of FIG. 2A.
Figure 2C:
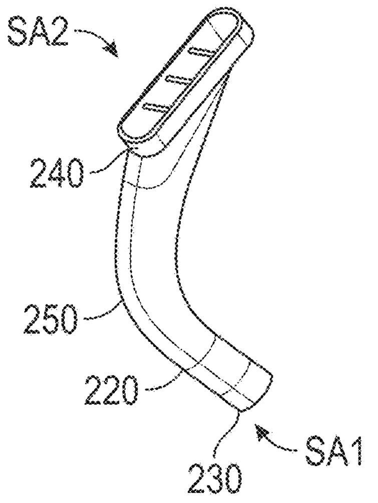
FIG. 2C shows additional details of the diffuser pipe.

Turning to FIGS. 2A-2C, the ACM 33 (or generally an aircraft system) may include an impeller housing 100 having that houses an impeller 105 or radial compressor, and heat exchangers 110, including first and second heat exchangers 110A, 110B. The heat exchangers 110 may be the same as each other so that, for simplicity, reference will be to the heat exchanger 110. The impeller 105 within the impeller housing 100. may be a compressor stage that is driven by one or more turbines, e.g., turbine 140A, via a shaft, e.g., shaft 145. The impeller housing 100 may receive an airflow (or first airflow) 120, where the airflow 120 is bleed air or air recirculated from the cabin 25 via a CAC 34 (FIG. 1). The airflow 120 may be compressed, resulting in heating, by the impeller 105 within the impeller housing 100, and thereafter cooled by the heat exchanger 110 exposed to, e.g., a second airflow 130 that is RAM air, and then directed to turbines 140 of the ACM 33. In the turbines 140, kinetic energy is extracted to drive the impeller 105 within the impeller housing 100, and the first airflow 120 is further cooled. The cooled airflow 120 may be directed to the cabin 25. In FIG. 2A, two turbines 140A, 140B are provided to obtain the proper flow characteristics for the cabin 25.

The impeller housing 100 may extend from an inlet end 150 to an outlet end 160. The outlet end 160 defines circumferentially distributed (e.g., in the circumferential direction C1) radial outlet ports 170 (i.e. ports facing the radial direction R1). It is to be appreciated that ports 170 are outlets with respect to the impeller 105 but are inlets relative to an inlet end 230 of diffuser pipes 220, discussed below. Therefore, reference to inlet and outlet herein is for convenience only and is not intended on requiring a specific flow direction at the identified location.

In operation, the airflow 120 moves along a first axial A1 direction into the impeller housing 100. An axially extending inlet conduit 180 is coupled to the inlet 150 of the impeller housing 100. As a result, in operation, the airflow 120 in the inlet conduit 180 flows along the first axial direction A1 into the impeller housing 100 to be compressed by the impeller 105.

The heat exchanger 110 is positioned radially exterior to the impeller housing 100 and extends axially from an inlet end 190 to an outlet end 200. The inlet end 190 of the heat exchanger 110 defines axially extending inlet ports 210. In operation, flow into the heat exchanger 110 flows along a second axial direction A2 that is opposite the first axial direction A1. As seen in FIG. 2A, the heat exchanger 110 is positioned to axially extend at least partially over the inlet conduit 180.

The ACM 33 includes diffuser pipes 220. The diffuser pipes are the same as each other so reference herein will be generally to diffuser pipe 220. Ones of the diffuser pipes 220 connect ones the inlet ports 210 of the heat exchanger 110 with ones of the outlet ports 170 of the impeller housing 100.

The diffuser pipe 220 extends from an inlet end 230 to an outlet end 240. The inlet end 230 of the diffuser pipe 220 is coupled to one of the outlet ports 170 of the impeller housing 100 and the outlet end 240 of the diffuser pipe 220 is coupled to one of the inlet ports 210 of the heat exchanger 110. A pipe bend 250 is defined between the inlet and outlet ends 230, 240 of the diffuser pipe 220. With the configuration of the diffuser pipe 220, at the inlet end 230 of the diffuser pipe 220, the airflow 120 is radial, and at the outlet end 240 of the diffuser pipe 220, the airflow 120 is axial.

The inlet end 230 of the diffuser pipe 220 has a first surface area SA1, and the outlet end 240 of the diffuser pipe 220 has a second surface area SA2 that is larger than the first surface area SA1. Between the inlet end 230 of the diffuser pipe 220 has a circular cross section and the outlet end 240 of the diffuser pipe 220 has an elliptical cross section. The cross sectional shape smoothly transitions from circular to elliptical between the inlet and outlet ends 230, 240 to provide for a uniform diffusion of the airflow 120. As show, in FIG. 2B, the diffuser pipe 220 extends along a spiral path or helical path between the inlet and outlet ends 230, 240. This configuration provides for a close-packing of the heat exchanger 110 with the impeller housing 100 and reduces friction losses in the airflow 120.

As indicated, plurality of the heat exchangers 110 are circumferentially distributed about the inlet conduit 180. Each of the heat exchangers 110 defines the inlet ports 210. Ones of the diffuser pipes 220 connect ones of the inlet ports 210 of the heat exchangers 110 with ones of the outlet ports 170 of the impeller housing 100. The heat exchangers 110 and diffuser pipes 220 form a unitary body, i.e. a heat exchanger assembly 300. In one embodiment the heat exchangers 110 and diffuser pipes 220 are formed via additive manufacturing.

Turning back to FIG. 2A, in the illustrated system, the turbines 140 are axially aligned with the inlet 150 of the impeller housing 100 and are disposed on an opposite axial side of the impeller housing 100 relative to the inlet conduit 180. The first turbine 140 receives the airflow 120 from the heat exchanger 110 via a first conduit 260 and may be coupled to the impeller housing via the (first) shaft 145. The second turbine 140B may be coupled to the first turbine via another (second) shaft 280 and may receive the airflow 120 from the first turbine 140A via a second conduit 290. The airflow 120 is directed to the cabin 25 from the second turbine 140B via a third conduit 300. As indicated, the plurality of turbines 140 may be required to obtain the desired energy and pressure drop to drive the impeller 105 in the impeller housing 100 and provide an airflow 120 having desired characteristics to the cabin 25.

Figure 3:
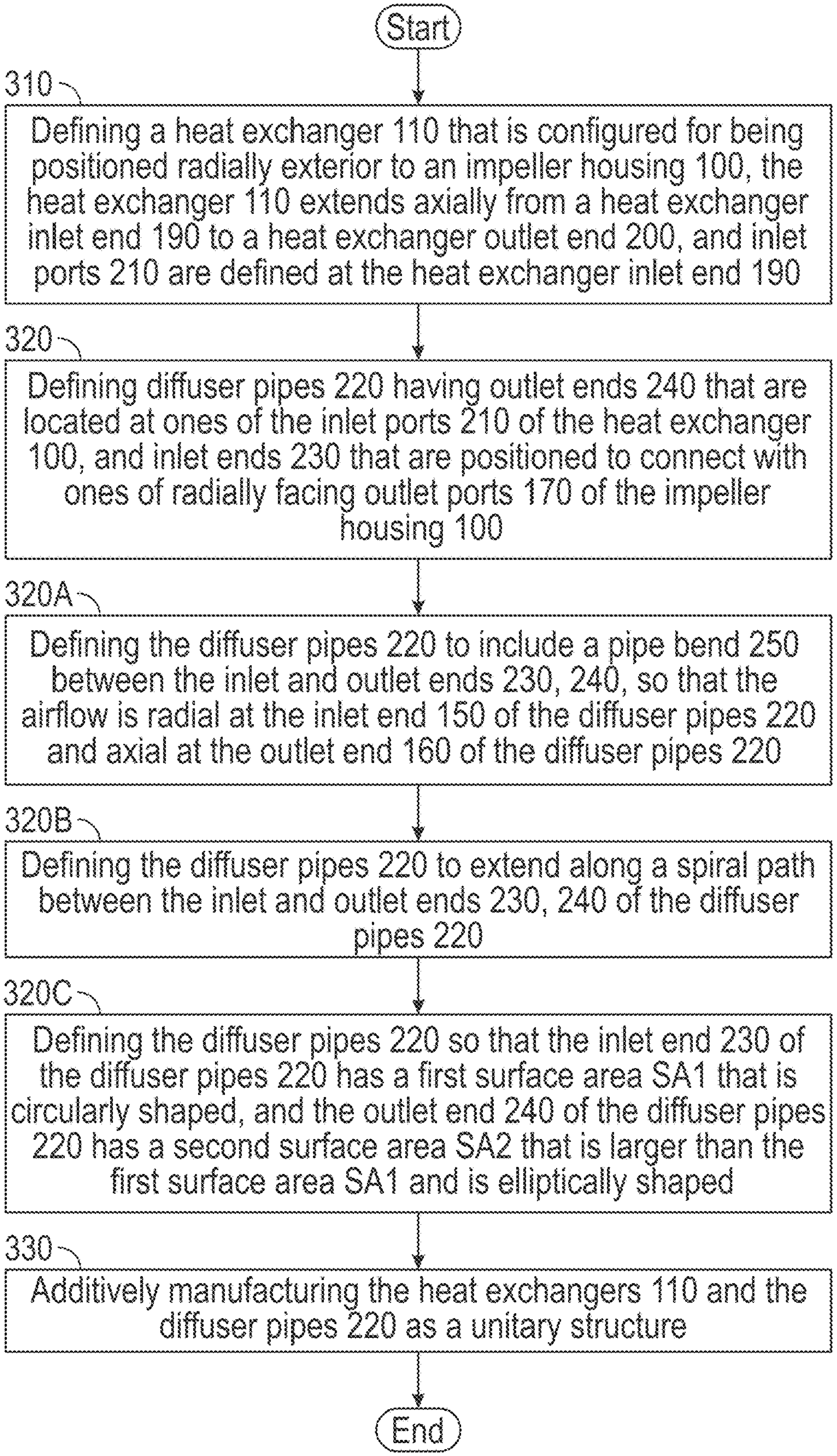
FIG. 3 is a flowchart showing a method of defining and manufacturing a heat exchanger assembly of an aircraft system.

Turning to FIG. 3, a flowchart shows a method of defining and manufacturing a heat exchanger assembly 300 of an aircraft system. As shown in block 310 the method includes defining a heat exchanger 110 that is configured for being positioned radially exterior to an impeller housing 100. The heat exchanger 110 extends axially from a heat exchanger inlet end 190 to a heat exchanger outlet end 200. Inlet ports 210 are defined at the heat exchanger inlet end 190.

As shown in block 320, the method includes defining diffuser pipes 220 having outlet ends 240 that are disposed at ones of the inlet ports 210 of the heat exchanger 100, and inlet ends 230 that are positioned to connect with ones of radially facing outlet ports 170 of the impeller housing 100.

As shown in block 320A the method includes defining the diffuser pipes 220 to include a pipe bend 250 between the inlet and outlet ends 230, 240 of the diffuser pipes 220, so that the airflow is radial at the inlet end 150 of the diffuser pipes 220 and axial at the outlet end 160 of the diffuser pipes 220. As shown in block 320B the method includes defining the diffuser pipes 220 to extend along a spiral path between the inlet and outlet ends 230, 240 of the diffuser pipes 220. As shown in block 320C the method includes defining the diffuser pipes 220 so that the inlet end 230 of the diffuser pipes 220 has a first surface area SA1 that is circularly shaped, and the outlet end 240 of the diffuser pipes 220 has a second surface area SA2 that is larger than the first surface area SA1 and is elliptically shaped.

As shown in block 325 the method includes defining a plurality of the heat exchangers 110 that are circumferentially distributed about the impeller housing 110. Each of the heat exchangers 110 defines the inlet ports 210. Ones of the diffuser pipes 220 are positioned at ones of the inlet ports 210 of the heat exchangers 110 and ones of the outlet ports 170 of the impeller housing 100. As shown in block 330 the method includes additively manufacturing the heat exchangers 110 and the diffuser pipes 220 as a unitary structure.

With the disclosed embodiments, locating the heat exchangers 110 in an annular configuration around the axis A1 of the ACM 33 enables the heat exchangers 110 to be advantageously integrated into the packaging or physical envelope of the ACM 33. This minimizes pressure loss and saves weight. The disclosed combination of the radial compressor 105 and diffuser pipe 220 provides advantages, including higher stage efficiency, lower friction losses, relatively better performance at high inlet Mach numbers, lower manufacturing cost, and smaller throat blockage compared to alternate designs. Additionally, utilizing a diffuser pipe 220 can improve centrifugal compressor stage efficiency of the compressor 100, e.g., for the high-pressure ratio through the ACM 33. The annular configuration of passages between compressor 100 and heat exchangers 110, via the diffuser pipes 220, has a larger cross-section than circular and linearly extending ducting in the same space, resulting in a reduced pressure loss. The diffuser pipes 220 connecting the compressor 100 and heat exchangers 110, together function as a manifold, such that a volute is not required. Another benefit of the annular configuration of the heat exchangers 110 is containment the component of the impeller housing 100, e.g., during a blade-out of the impeller 105 or other similar event.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An environmental control system of an aircraft comprising:
 an impeller housing,
 an impeller housed within the impeller housing,
 wherein:
 the impeller housing extends from an inlet end and to an outlet end;
 the outlet end defines circumferentially distributed radially facing outlet ports; and
 in operation an airflow moves along a first axial direction into the inlet end of the impeller housing and is compressed by the impeller;
 a heat exchanger that is positioned radially exterior to the impeller housing and extends axially from an inlet end to an outlet end,
 wherein:
 the inlet end of the heat exchanger defines inlet ports; and
 in operation airflow into the heat exchanger moves along a second axial direction that is opposite the first axial direction; and
 diffuser pipes,
 wherein ones of the diffuser pipes connect ones of the inlet ports of the heat exchanger with ones of the outlet ports of the impeller housing;

wherein:

the impeller is a cabin air compressor, the heat exchanger is a RAM air heat exchanger;

an axially extending inlet conduit is coupled to the inlet end of the impeller housing; in operation, the airflow into the inlet conduit moves along the first axial direction and into the impeller housing; and the heat exchanger extends axially over the inlet conduit; and each diffuser pipe extends from an inlet end to an outlet end; the inlet end of the diffuser pipe is coupled to one of the outlet ports of the impeller housing and the outlet end of the diffuser pipe is coupled to one of the inlet ports of the heat exchanger; wherein each diffuser pipe is configured so that the airflow is radial at the inlet end of the diffuser pipe and axial at the outlet end of the diffuser pipe;

wherein the system includes one or more turbines between the outlet of the heat exchanger and a cabin-air conduit that directs air at a predetermined temperature and pressure to a cabin.

2. The system of claim 1, wherein:

a pipe bend is defined between the inlet and outlet ends of the diffuser pipe, so that the airflow is radial at the inlet end of the diffuser pipe and axial at the outlet end of the diffuser pipe.

3. The system of claim 2, wherein the inlet end of the diffuser pipe has a first surface area, and the outlet end of the diffuser pipe has a second surface area that is larger than the first surface area.

4. The system of claim 3, wherein the inlet end of the diffuser pipe has a circular cross section and the outlet end of the diffuser pipe has an elliptical cross section.

5. The system of claim 4, wherein the diffuser pipe extends along a spiral path between the inlet and outlet ends.

6. The system of claim 5, including:

a plurality of the heat exchangers circumferentially distributed about the impeller housing, each defining the inlet ports; and ones of the diffuser pipes connect ones of the inlet ports of the heat exchangers with ones of the outlet ports of the impeller housing.

7. The system of claim 1, wherein the impeller housing is a compressor housing and the impeller is a compressor stage.

8. The system of claim 7, wherein the one or more turbines comprises a first turbine that is aligned with the inlet end of the impeller housing, is disposed on an opposite axial side of the impeller housing relative to the inlet conduit, and is coupled to the impeller housing via a first shaft.

9. The system of claim 8, wherein the one or more turbines comprises a second turbine that is aligned with the first turbine, disposed on a same side of the impeller housing as the first turbine, and is operationally coupled to the first turbine via a second shaft.

10. The system of claim 6, wherein the heat exchanger and the diffuser pipes define a unitary body.

11. The system of claim 6, wherein the heat exchanger and the diffuser pipes are formed via additive manufacturing.

* * * * *